Aug. 6, 1940.    W. C. SHAW    2,210,603
ELECTRIC SOCKET ADAPTER
Filed Nov. 22, 1937
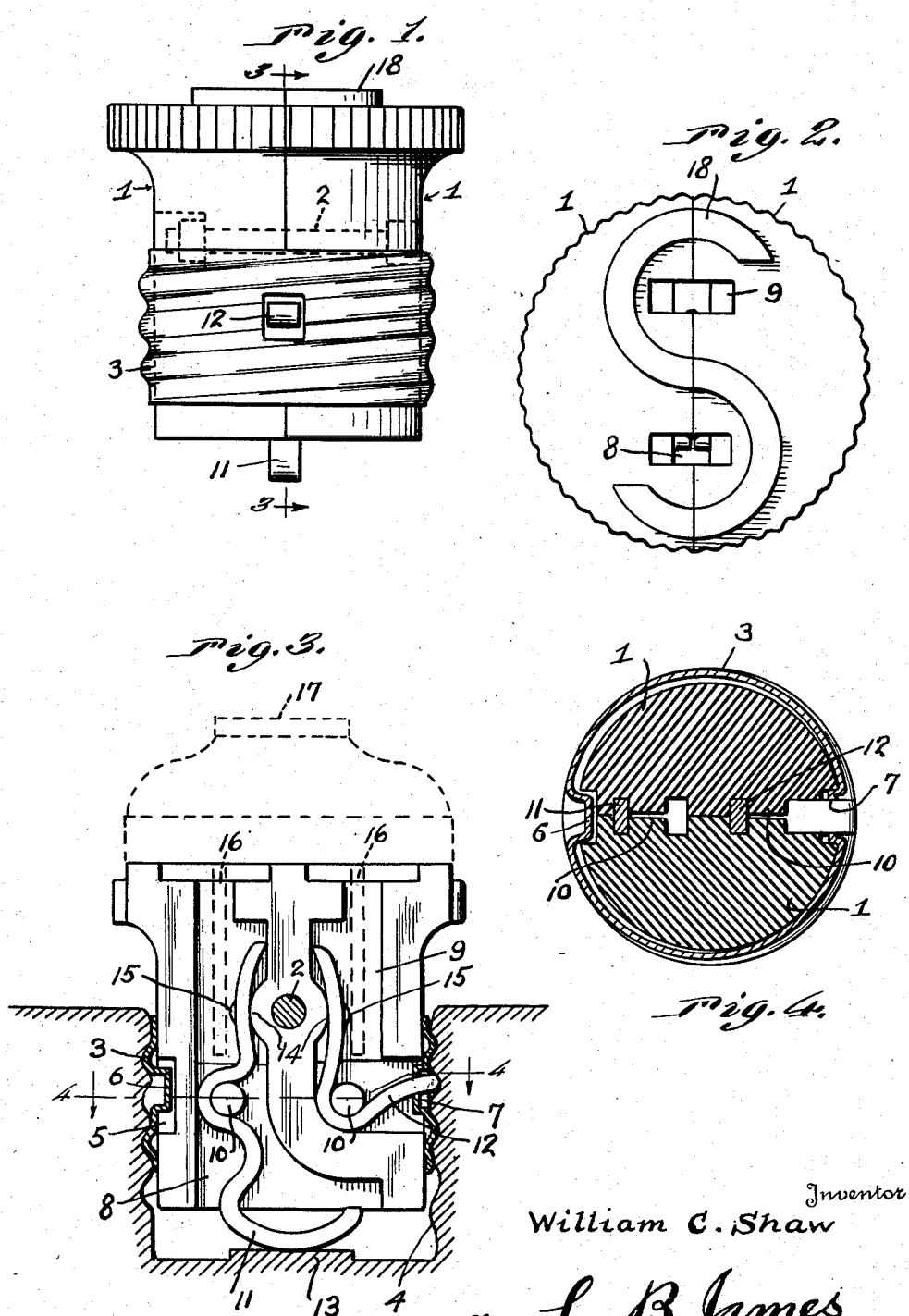
Inventor
William C. Shaw
By L. B. James
Attorney Patented Aug. 6, 1940

2,210,603

UNITED STATES PATENT OFFICE 2,210,603

ELECTRIC SOCKET ADAPTER

William C. Shaw, Appleton, Minn.

Application November 22, 1937, Serial No. 175,933

9 Claims. (Cl. 173—343)

This invention relates to an electric socket adapter, the general object of the invention being to provide a socket adapter with means whereby the parts thereof will make firm interlocking contact with the prongs of an electric plug so it cannot be accidentally pulled from the socket and also to establish positive electrical connection between the adapter and plug.

Another object of the invention is to make the interior parts of the socket adapter easily accessible and to actuate the movable parts thereof by a partial rotary movement of the socket in the wall socket.

With these and other objects in view this invention resides in certain novel features of construction and arrangement of elements to be hereinafter more fully set forth in the specification, illustrated in the accompanying drawing and pointed out in the appended claims and, while this disclosure depicts my present conception of the invention, the right is reserved to resort to such changes in arrangement and combination of elements as come within the scope of the claims.

In the accompanying drawing forming a part of this application:

Fig. 1 is an elevation of the improved socket adapter.

Fig. 2 is a top plan view thereof.

Fig. 3 is a vertical sectional view on line 3—3 of Fig. 1, showing the socket adapter in the wall or floor socket.

Fig. 4 is a sectional view on line 4—4 of Fig. 3.

As shown in the present embodiment of this invention the adapter is composed of two sections, herein designated by the numeral 1, which are connected together by a bolt 2. A metal shell 3 encircles a part of the adapter and is grooved to provide threads for engaging the threads of a wall or floor socket 4, as shown in Fig. 3. A pair of oppositely arranged notches 5 are formed in the adapter to receive projections 6 on the shell to cause the shell to turn with the adapter and one of the projections is formed with an opening 7. The shell also has limited sliding movement on the adapter. A pair of longitudinal extending passages 8 and 9 are formed by the two sections, when the same are placed together, the passage 8 opening out through the inner end of the adapter and the passage 9 opening out through a side part thereof at the point where the projection 6 with the hole therein is located. Circular projections 10 are formed in the passage forming parts of each section and these projections of the two sections form pivots for the rocking contact members 11 and 12, which are formed from metal strips, each of which is roughly in the form of an L. The member 11 is of greater length than the member 12 and is located in the passage 8 with its short arm curved and projecting from the inner end of the adapter to engage the usual contact projection 13 in the bottom of the socket 4, which causes movement of the member on its pivot.

The long arm of this member is formed with a loop intermediate its ends to fit over the pivot. The two arms of member 12 also form a loop to engage its pivot and the short arm of this member 12 extends through the hole 7 to engage a part of the groove in the socket 4. The upper or outer parts of the long arms of the two members 11 and 12 are located in the outer parts of the passages 8 and 9 and are slightly bowed in opposite directions with the concave faces of said parts normally engaging the rounded parts 14 on the inner walls of the passages, as shown in Fig. 3. The convex face of each part has a small lug 15 thereon.

When the prongs 16 of a plug 17, shown in dotted lines in Fig. 3, are pushed into the passages 8 and 9, they will pass along the lug carrying faces of the upper or outer parts of the members 11 and 12. Then by giving the adapter a slight turning movement it will move inwardly into the socket 4, which will cause the projection 13 to press upon the short curved arm of the member 11, thus causing the member to rock on its pivot and cause its upper or outer part to firmly engage the corresponding prong while the short arm of member 12 will engage a part of the groove of the socket 4 which will cause said member to rock on its pivot and thus its long arm will be pressed against the other prong. As the adapter is screwed in, with the plug in place, movement of the body 1 inwardly will eventually be arrested by engagement of member 11 with member 13. Further turning of the adapter in the same direction as before will cause shell 3 to move inwardly in the socket 4, carrying the short arm of member 12 with it so that the long arm of the member 12 will be moved against the right prong 16. If these prongs have the usual holes or recesses therein the lugs 15 will enter them but even if the prongs are not provided with such holes or recesses the lugs will spread the prongs apart and thus firmly hold them in the adapter. When the plug is to be removed the adapter is turned in the opposite direction which will permit the members 11 and 12 to move to releasing position so the prongs can be withdrawn from the adapter. It will be understood that the members 11 and 12 engage electrical connections in socket 4, as usual.

In order to facilitate the placing of the prongs in the passages, the outer end of the adapter is formed with an S shaped rib 18 thereon which is so arranged as to guide the prongs into the passages of the adapter, as shown in Fig. 2.

With this invention thus described it is apparent that a socket adapter is provided whereby positive and secure electrical connection is established between the plug and adapter and, through the instrumentality of the elements thus involved, the adapter being of simple construction can be manufactured and marketed at a reasonable price.

Having thus described my invention what I claim and desire to protect by Letters Patent is:

1. A socket plug of the class described comprising a body having a pair of passages therein, one opening out through the inner end thereof and the other through a side thereof, a threaded shell, means to mount said shell on said body for limiting sliding movement on a part of the body, a pair of substantially L shaped contact members supported in the passages for rocking movement, one member having one arm at the inner end of the body to engage a projection in the bottom of a socket to cause the other arm of the member to engage the prong of a plug located in the outer part of the passage and an arm of the other member engaging the shell to move with the shell to cause engagement of the other arm of said member with the other prong of the plug.

2. A socket plug of the class described comprising a body having a pair of passages therein, one opening out through the inner end of the body and the other through a side thereof, said body having a notch in its peripheral wall, a threaded shell encircling a part of the body and having an internal projection to lie in said notch and being of a size to permit limited sliding movement of said shell on said body, a pivot passing transversely through each passage, a pair of substantially L shaped contact members in the passages, portions of said members having looped parts engaging the pivots, the short arm of one member extending across the inner end of the body to engage a projection at the bottom of a socket, to cause the other arm to swing outwardly to engage a prong of a plug in the passage, an arm of the other member engaging the projection of the shell which lies in said notch to cause the arm to move with the shell, to swing the other arm of said member against the other prong of the plug.

3. A socket adapter of the class described, comprising a body having passages therein for receiving the prongs of a plug and having internally contained contact members for cooperation with said prongs, in combination with means operable, while the adapter is in the receptacle and upon rotation of the adapter in one direction only from its normal position, to bring one of the said contact members into holding-pressure contact with one of said prongs and operable upon rotation of the adapter only in the opposite direction from its normal position to release said contact member from pressure contact with its prong, said means including a member movable longitudinally of said body and cooperating with said one of said contact members for bringing said contact member into and out of contact with said one of said prongs accordingly as said socket adapter is screwed inward or outward while still in the receptacle.

4. A socket adapter of the class described, comprising in combination, a body having passages therein for receiving the prongs of a plug and having an external threaded shell for screwing the adapter into a threaded receptacle, contact members located in said body for engagement by the prongs of the plug when in said passages, and mechanical means cooperating with at least one contact member for applying prong-spreading pressure and effecting a holding engagement between said contact member and the prong with which it engages upon rotation of the adapter in one direction only while in the receptacle and for releasing the prong-spreading and holding pressure upon rotating the adapter in the opposite direction only while in the receptacle to permit pulling the plug out while the adapter is still in the receptacle.

5. A socket adapter of the class described, comprising in combination, a body having passages therein for receiving the prongs of a plug and having an external threaded shell for screwing the adapter into a threaded receptacle, contact members located in said body for engagement by the prongs of the plug when in said passages, and mechanical means cooperating with at least one contact member for applying prong-spreading pressure and effecting a holding engagement between said contact member and the prong with which it engages upon rotation of the adapter in one direction only while in the receptacle and for releasing the prong-spreading and holding pressure upon rotating the adapter in the opposite direction only while in the receptacle to permit pulling the plug out while the adapter is still in the receptacle, said means including a member movable longitudinally of said body accordingly as said body is screwed inwardly or outwardly while still in the receptacle.

6. A socket adapter of the class described, comprising in combination, a body having passages to receive a pair of approximately parallel prongs of a plug, and having an external threaded shell for screwing the adapter into a threaded receptacle, a pair of contact members located in the body in position between the prongs, and mechanical means operable upon turning the adapter in the receptacle in one direction for applying pressure against the prongs in directions tending to spread the prongs apart and for effecting pressure-contact between said contact members and said prongs, and, upon turning the adapter in the opposite direction, for releasing said applied pressure to permit the withdrawal of said plug while the adapter remains in the receptacle.

7. A socket adapter of the class described, comprising in combination, a body having passages therein to receive the prongs of a two-prong plug and having a threaded shell on its outer face for screwing the adapter into a threaded receptacle, means within the body for engagement with said prongs to effect contact therewith, said means including at least one contact member situated between said prongs, and mechanical means cooperating with that contact member for applying prong-spreading pressure and effecting a holding engagement between said contact-effecting means and said prongs upon rotation of the adapter in one direction only while the adapter remains threaded in the receptacle and for releasing the prong-spreading and holding pressure upon rotating the adapter in the opposite direction only while still in the receptacle to permit the plug to be pulled out while the adapter remains in the receptacle.

8. A socket plug of the class described, comprising a body having a pair of passages therein, a pair of contact members in said body with portions in said passages located to lie between a pair of prongs of a connection plug when such prongs are inserted into said passages, a threaded shell mounted on said body for limited movement in the direction of the axis of the body, and means cooperative with said shell upon screwing the shell into a threaded receptacle for bringing one of said contact members into holding contact with one of said prongs.

9. A socket plug of the class described, comprising a body having a pair of passages therein, a pair of contact members in said body with portions in said passages located to lie between a pair of prongs of a connection plug when such prongs are inserted into said passages, a threaded shell mounted on said body for limited movement in the direction of the axis of the body, means cooperative with said shell upon screwing the shell into a threaded receptacle for bringing one of said contact members into holding contact with one of said prongs, and means causing the other of said contact members to be brought into holding contact with the other prong upon completely screwing the plug into the receptacle.

WILLIAM C. SHAW.